C. A. MENDENHALL.
RESILIENT WHEEL.
APPLICATION FILED FEB. 24, 1920.

1,366,407.

Patented Jan. 25, 1921.
2 SHEETS—SHEET 1.

Witness
Edwin L. Bradford

Inventor
Charles A. Mendenhall.
By Wm. E. Dye
Attorney

C. A. MENDENHALL.
RESILIENT WHEEL.
APPLICATION FILED FEB. 24, 1920.
1,366,407.
Patented Jan. 25, 1921.
2 SHEETS—SHEET 2.
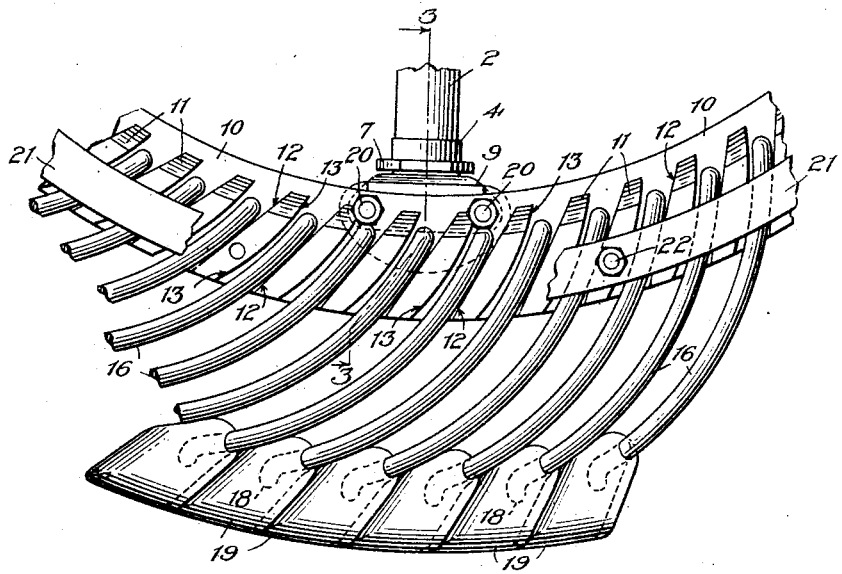
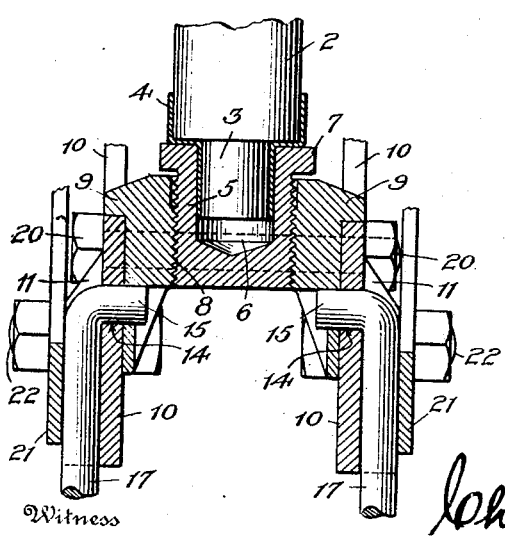
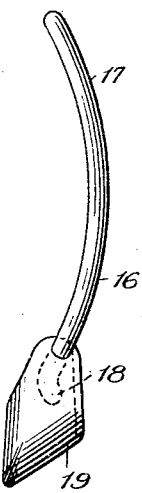
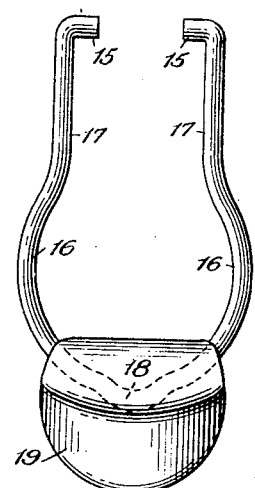
Witness
Edwin L. Bradford
Inventor
Charles A. Mendenhall
By Wm. E. Dyre
Attorney

UNITED STATES PATENT OFFICE.

CHARLES A. MENDENHALL, OF FARMLAND, INDIANA.

RESILIENT WHEEL.

1,366,407.   Specification of Letters Patent.   Patented Jan. 25, 1921.

Application filed February 24, 1920. Serial No. 360,874.

*To all whom it may concern:*

Be it known that I, CHARLES A. MENDENHALL, a citizen of the United States, residing at Farmland, in the county of Randolph and State of Indiana, have invented certain new and useful Improvements in Resilient Wheels; and I do hereby declare the following to be a full, clear, and exact description of the invention, such as will enable others skilled in the art to which it appertains to make and use the same.

My present invention relates to resilient vehicle wheels, more particularly for automobile use, as exemplified by U. S. Letters Patent numbered 1,120,514, issued to me under date of December 8, 1914; and Numbers 1,295,555 and 1,295,556, issued to me under date of February 25, 1919.

This invention has for its primary object the production of resilient or cushion wheels, which employ neither outer casings nor inner tubes, and which are therefore both puncture and blow-out proof.

The invention has for a further object the production of wheels of the character aforesaid, which are comparatively inexpensive to manufacture, extremely durable and efficient in the accomplishment of their intended purposes, and not likely to become deranged or to get out of order.

A further object is the production of airless tires and wheels which require no inflating or pumping, and which at the same time are even more resilient than pneumatic tires.

A further object is the production of wheels having airless tires formed of a continuous contacting series of circumferentially arranged elastic tread members under slight compression, each carried by its individual supporting arm of spring material for affording additional resiliency.

With the foregoing and other objects in view the present invention consists in the general arrangement and combination of parts hereinafter particularly described and pointed out in the claims following:

In the accompanying drawings which illustrate a practical embodiment of my present invention, and whereon corresponding numerals refer to like parts in the several views:—

Fig. 2 is a relatively enlarged fragmentary view in side elevation of the invention partly broken away for the purpose of disclosing the operative connections or spring supporting arms;

Fig. 3 is a transverse section of the invention taken on a zig-zag line 3—3 of Fig. 2;

Fig. 4 is a side elevation of one supporting spring and its terminal elastic road-contacting shoe, detached; and Fig. 5 is a front elevation of parts shown by Fig. 4.

Figure 1:
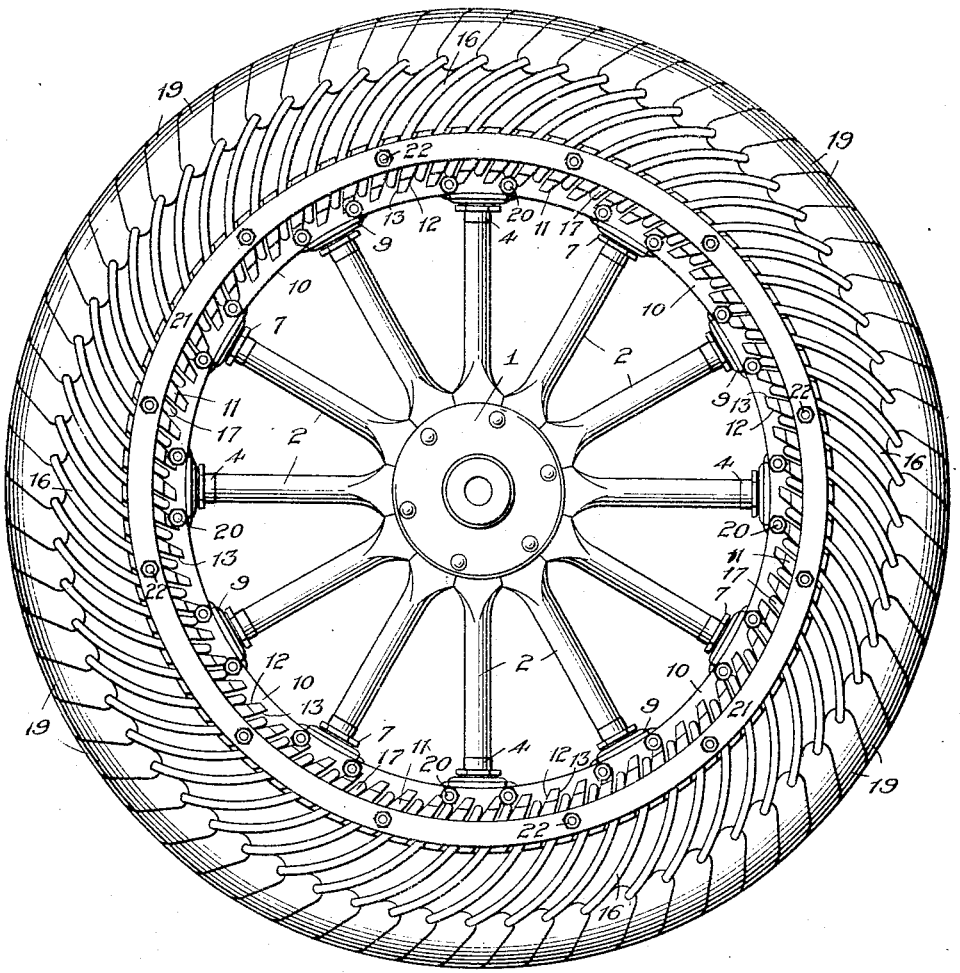
Figure 1 is a side elevation of a wheel and resilient tire, constituting my invention, assembled in operative relation.

Reference being had to the accompanying drawings and numerals thereon, it will be observed that the invention comprises a multiplicity of individual tread members in contact and in circumferential alinement, a corresponding series of individual spring supports for said tread members, and a fabricated rim structure coöperatively arranged. To this end a wheel is formed with the usual hub 1 and radial spokes 2, the latter being shouldered at their outer ends and tenoned as at 3. These tenons are each incased by a tubular ferrule 4 extending over the spoke shoulder and around the outer end of its particular spoke 2 so as to guard against checking or cracking the latter when subjected to the setting up pressure.

Surrounding each of the tenons, and tenon-guards aforesaid, is a spoke connector or nipple 5 having a smooth interior bore 6, a hexagonal head 7, and a screw threaded exterior 8 as best shown by Fig. 3. This screw threaded nipple 5 is threaded into a forged rim coupling 9 so as to permit of slight radial adjustment of said nipple by means of a wrench (not shown) applied to its head 7, thus providing for truing or setting up the spoke and rim members during the process of assembling, or for subsequently adjusting same concentrically with relation to hub 1.

Recessed into opposite sides of all rim couplings 9 are corresponding annular and unbroken rim flanges 10, 10, each having upon its outer face a series of outwardly projecting elongated lugs 11, successively crossing said flanges from near their inner to their outer edges. These lugs 11 are angularly arranged and are uniformly spaced entirely around the outer faces of both flanges 10 as shown by Figs. 1 and 2. They are preferably straight upon their forward edges 12 and curved upon their rear or opposite edges 13 for purposes which will later appear.

At regular intervals between each pair of said lugs 11, near their innermost ends, each of the oppositely disposed rim flanges 10, 10, are perforated as at 14 to pivotally receive the angular inturned extremities 15, 15, of a circumferential series of tire springs 16. These springs 16 are of substantially U-shape, having parallel sides 17 where they cross said rim flanges, and are preferably formed with a kink 18 or its equivalent in their outer extremities to assist in retaining in operative relation road-contacting elastic tread members 19 of the general form indicated by Figs. 4 and 5. The said tread members 19 may be made of any suitable elastic or resilient material, such as suitably compounded rubber, and, as shown, are preferably molded or formed in position upon their respective springs 16, with relatively straight front and rear surfaces adapted to contact as best shown by Fig. 1, and to collectively form a continuous annular cushion tread surface.

In the course of assembling, the tread members or shoes 19 are introduced under a slight circumferential compression of $\frac{3}{16}$ of an inch, more or less, which compression insures a remarkably uniform tread surface in the aggregate, assists materially in maintaining all parts in proper operative relation, and, what is of even greater practical importance, results in normally seating the convex or rear side of each spring 16 against the straight forward edge 12 of one lug 11, at the same time holding it normally free from the rear curved edge 13 of the adjacent lug, except when subjected to abnormal loads or shocks, and at such times the load carrying springs 16 are flexed gradually into contact with the curved edges 13 aforesaid to assist in carrying the load or resisting shocks.

At each side of all spokes 2, the rim flanges 10, 10, are securely fastened together by through bolts 20, passing also from side to side through the rim coupling 9, which latter thus performs the additional functions of a spacing member.

As best shown by Figs. 1 and 2, outside annular flanges or circular plates 21, 21, rest directly upon all lugs 11 by which they are suitably spaced from their respective rim flanges 10, and these plates are securely held in place by means of short bolts 22 passing through some of said lugs at intervals around the rim structure.

This being a description of my present invention in one form of embodiment, its use and operation as a resilient wheel for vehicles, and particularly for automobiles, is quite obvious, and need not be herein particularly enlarged upon. It may be noted, however, that tire injuries are localized, and that repairs may be speedily and economically made by removing any one or more of the springs 16 together with their individual tread members or shoes 19, and substituting therefor other such members without affecting the balance of the wheel structure. The springs 16 also coöperate most efficiently with the elastic tread members 19 to cushion the vehicle under all conditions, and when as the result of excessive strains said springs 16 are forced into contact with the curved surfaces 13 of lugs 11, it will be particularly noted that their spring action is thereupon materially increased.

In addition to the advantages hereinbefore mentioned arising directly out of the arrangement of tread members 19 under a slight initial compression, it may be noted that better traction is insured as the lowermost edges of these individual tread members successively engage the road bed, than could possibly be obtained from a smooth, unbroken tread surface.

The "forward" and "rear" edges of lugs 11 hereinbefore mentioned should be understood to mean forward and rear with relation to the direction of travel of the wheel as a whole, that is to say from right to left in Fig. 1 of the drawing.

The foregoing being a description of my invention in its preferred form of construction, it should be understood that various changes in the arrangement and combination of parts may be made and substituted for those shown and described without in the least departing from the spirit and intent of my invention as set forth in the following claims:

Having thus described my invention what I now claim and desire to secure by Letters Patent is:—

1. A resilient wheel of the class described including in combination a tread surface composed of a continuous circumferential series of individual tread members under compression, and spring means for securing said members to the wheel rim.

2. A resilient wheel of the class described including in combination an elastic tread composed of an endless series of individual tread members under compression in contact and in circular arrangement, and spring means for securing each of said members to the wheel rim.

3. A resilient wheel of the class described including in combination a tread surface composed of a multiplicity of individual tread members under compression, and a tire spring connecting each of said tread members to the wheel rim.

4. A resilient wheel of the class described including in combination a tread surface composed of a multiplicity of individual tread members under compression, a fabricated wheel rim including oppositely disposed spaced apart flanges, elongated lugs located upon the outer faces of said flanges, and tire springs connecting said tread members and flanges, each of said springs normally bearing upon the forward edge of one of said lugs.

5. A resilient wheel of the class described including in combination oppositely disposed rim flanges, a circular series of elongated lugs crossing the outer face of each rim flange, tire springs secured to said flanges intermediate adjacent lugs, and an elastic tire formed of a series of independent tread members under compression each carried by one of the tire springs.

In testimony whereof I affix my signature, in presence of two subscribing witnesses.

CHARLES A. MENDENHALL.

Witnesses:
 NORMAN HILTNES,
 FLORENCE F. JACKSON.